United States Patent [19]
Hornung et al.

[11] Patent Number: 5,380,142
[45] Date of Patent: Jan. 10, 1995

[54] DROP CHUTE EXTENSION FOR A SHUTTLE DUMPING TRANSPORT VEHICLE FOR HARVESTED COTTON

[75] Inventors: Donald F. Hornung, Dodge City; Thomas A. Klenke, Spearville; Melvin L. Burge, Dodge City, all of Kans.

[73] Assignee: CrustBuster/Speed King, Inc., Dodge City, Kans.

[21] Appl. No.: 67,356

[22] Filed: May 24, 1993

[51] Int. Cl.⁶ .......................... B60P 1/16; B60P 1/36
[52] U.S. Cl. .......................... 414/491; 298/7; 298/18; 414/528
[58] Field of Search ............... 298/7, 18; 414/473, 414/528, 491

[56] References Cited

U.S. PATENT DOCUMENTS

| | | | |
|---|---|---|---|
| 1,755,120 | 4/1930 | Kerr | 298/7 |
| 3,179,305 | 4/1965 | Wiens | 414/528 X |
| 3,629,890 | 12/1971 | Harris | 414/528 X |
| 3,937,502 | 2/1976 | Gay | 298/18 X |
| 4,034,716 | 7/1977 | Fleming | 119/82 |
| 4,078,685 | 3/1978 | Corbin et al. | |
| 4,148,527 | 4/1979 | Steele | 298/10 |
| 4,430,038 | 2/1984 | Rempel et al. | 414/491 X |
| 4,458,588 | 7/1984 | Steele | 100/100 |
| 4,494,904 | 1/1985 | Hill et al. | 414/491 |
| 4,662,160 | 5/1987 | Hubbard et al. | 298/18 X |
| 5,103,623 | 4/1992 | Herrett | 56/14.7 |

FOREIGN PATENT DOCUMENTS 260788 3/1968 Austria .......................... 414/491

Primary Examiner—David A. Bucci
Assistant Examiner—Janice L. Krizek
Attorney, Agent, or Firm—Stinson, Mag & Fizzell

[57] ABSTRACT

A drop chute extension for unloading a shuttle dumping transport vehicle for harvested cotton bolls extends the length of the conveyor dump side wall when unloading the transport vehicle. The extension of the conveyor dump side wall allows cotton to be dumped in the middle and far side of a module builder or trailer. The drop chute extension can be folded over and down into the basket of the dumping transport vehicle, reducing both the transport height and width of the vehicle. The drop chute extension includes two hydraulic extension arm cylinders which cause the door chute to extend or retract and are interconnected with the hydraulic system of the vehicle lift basket. Operation of the basket lift cylinders is precluded until the extension arm cylinders have fully extended the chute door. The drop chute extension is also joined to a second hydraulic system to operate an unloading conveyor which extends into the extension. The second hydraulic system has a safety selector valve that prevents operation of the conveyor hydraulic system until the chute has been fully extended. There is also a uni-directional flow valve in the chute extension conveyor drive system that allows the conveyor to travel in only one direction.

10 Claims, 4 Drawing Sheets

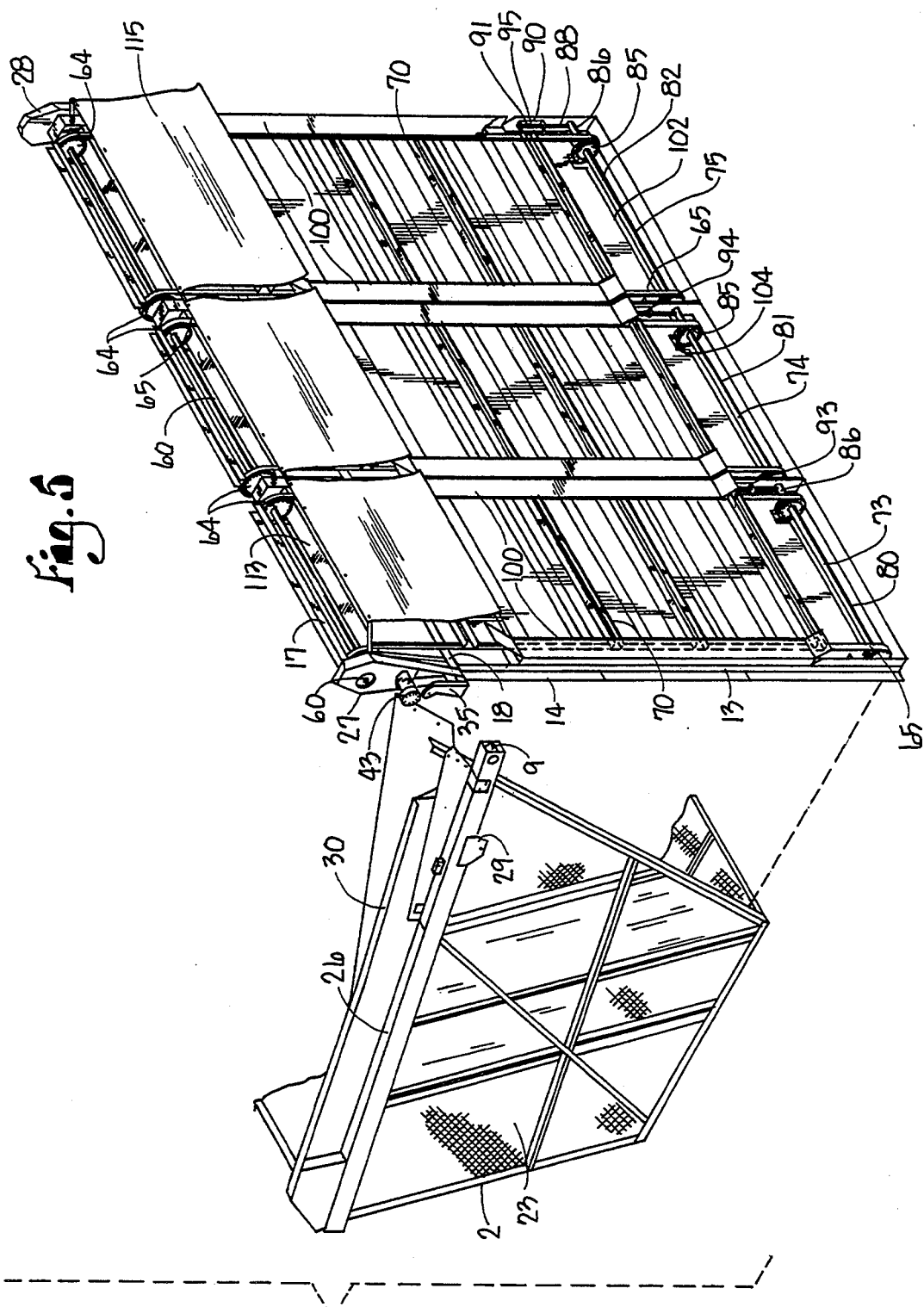

DROP CHUTE EXTENSION FOR A SHUTTLE DUMPING TRANSPORT VEHICLE FOR HARVESTED COTTON

FIELD OF THE INVENTION

This invention relates to a drop chute extension for a dumping transport vehicle for harvested cotton.

BACKGROUND OF THE INVENTION

Shuttle dumping transport vehicles for harvested cotton are currently used in the market. These vehicles include chain driven conveyor belts for unloading harvested cotton. The vehicles must be positioned close to the module builder or trailer wagon for proper unloading of the cotton into the module builder or trailer. Current dumping vehicles, however, have wide baskets or holding containers that make it difficult for the operator to easily position the vehicle beside a module builder or trailer for unloading. The present invention provides a drop chute extension that is connected to the dumping wall side of the vehicle and which can be selectively retracted or completely extended, thereby increasing distance over which the cotton can be dumped into the module builder. An extended conveyor section in the chute extension directs the outward flow of cotton in the middle and far side of the module builder or trailer, providing even distribution and allowing the module builder or trailer to be completely filled. The present invention also provides that the drop chute extension can be folded over and retracted into the basket of the shuttle dumping vehicle, allowing for easy transport down the road without undue concern about hitting overhead obstructions.

Shuttle dumping transport vehicles, such as the "BOLL BUGGY" (a registered trademark of the assignee of the present invention), that include the present invention have a safety feature that is intended to prevent operation of the conveyor belt until the drop chute extension is fully extended and the basket of the vehicle has been lifted. This safety feature prevents damage to equipment.

SUMMARY OF THE INVENTION

The principle objects of the present invention are: to provide an extendable and retractable drop chute extension for a shuttle dumping transport vehicle for harvested cotton; to provide such a drop chute extension which is easily remotely operated from a tractor; to provide such a drop chute extension which includes a safety selector valve that prevents operation of the chain unloading conveyor belt until the drop chute extension is fully extended; to provide such a drop chute extension that extends the length of a conveyor dump side wall for unloading cotton in the middle and far side of a modular builder or trailer; to provide such a drop chute extension that can be folded over and down into the basket or loaded container, thereby reducing both transport height and width of the shuttle dumping transport vehicle; to provide such a drop chute extension that includes hydraulic extension arm cylinders that activate the drop chute extension and which are connected to the vehicle's hydraulic system to also operate the vehicle's bottom lift cylinders; to provide such a drop chute extension that includes extension arm cylinders that will unfold and completely extend before the lift cylinders lift the basket of the vehicle; to provide such a drop chute extension that will remain extended until the basket is again lowered by the lift cylinders of the vehicle; to provide such a drop chute extension that includes a second hydraulic system to operate the chain unloading conveyor chain; and to provide such a drop chute extension that includes a uni-directional flow valve for single direction travel of the chute extension conveyor.

Other objects and advantages of this invention will become apparent after considering the following disclosure.

BRIEF DESCRIPTION OF THE DRAWINGS

FIG. 5 is a disassembled, perspective view of the vehicle conveyor belt with the drop chute extension in the extended position.

DESCRIPTION OF THE PREFERRED EMBODIMENT

As required, a detailed embodiment of the present invention is disclosed herein. It is, however, to be understood that the disclosed embodiment is merely illustrative of the invention, which may be embodied in various forms. Therefore, specific structural and functional details disclosed herein are not to be interpreted as limiting, but merely as providing the proper basis for the claims and as a representative basis for teaching one skilled in the art to employ the drop chute extension for unloading a shuttle dumping transport vehicle for harvested cotton.

Figure 1:
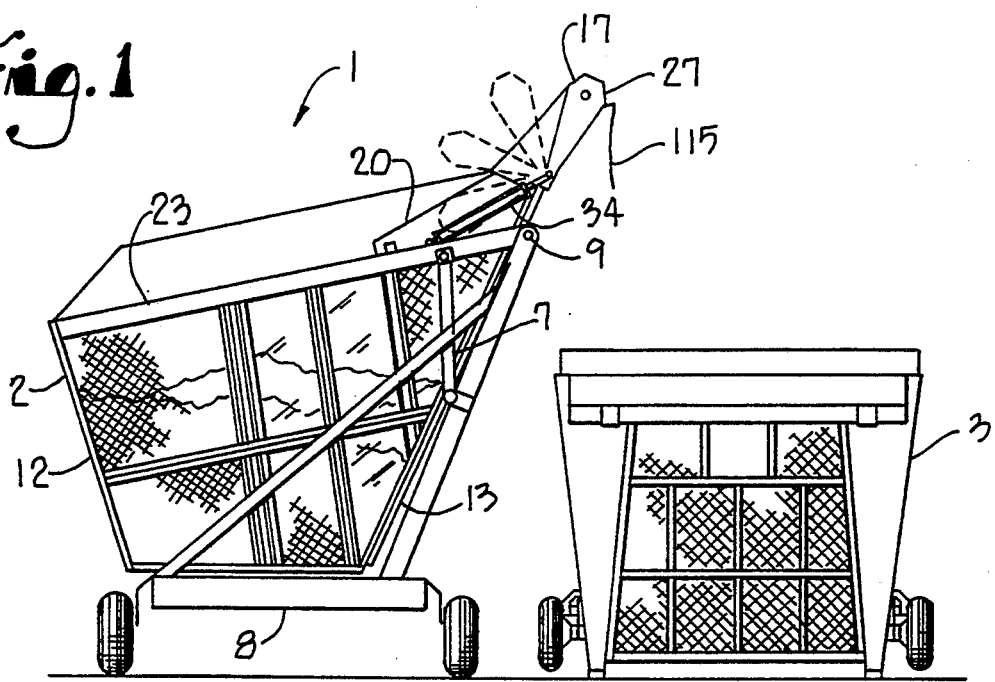
FIG. 1 is an end elevational view of a shuttle dumping transport vehicle for harvested cotton bolls and with a drop chute extension embodying the present invention fully extended over a module builder or trailer.

The reference numeral 1, FIG. 1, is generally directed to a shuttle dumping transport vehicle having a basket 2 that is positioned adjacent a module builder or trailer 3. The vehicle 1 is similar to the vehicle disclosed in U.S. Pat. No. 4,458,588, herein incorporated by reference, and which is commonly owned with this application. The basket 2 holds cotton bolls 4 that are to be unloaded in the module builder or trailer 3. The vehicle 1 has hydraulic lift cylinders 7, a transport base 8, an upper pivot connection 9, a dump in end wall 12, a dump out end wall 13 having an upper unloading end 14, and a drop chute extension 17. The hydraulic lift cylinders 7 lift the basket about the pivot connection 9, thereby swinging the basket 2 up and away from the transport base 8, FIG. 2. The drop chute extension 17 is connected to the upper unloading end 14 of the dump out end wall 13 at an extension pivot joint 18, FIGS. 3 and 4. When the drop chute extension 17 is completely extended, it is in an unloading position 19. The drop chute extension 17 when fully retracted, is in a towing position 20 and is stowed back into the basket 2, FIG. 1.

The basket 2 has first and second opposite side walls 23 and 24, respectively. The hydraulic lift cylinders 7 are secured to the transport base 8 on either side and adjacent to the first and second opposite side walls 23 and 24. The drop chute extension 17 extends substantially between the first and second opposite side walls 23 and 24.

Figure 2:
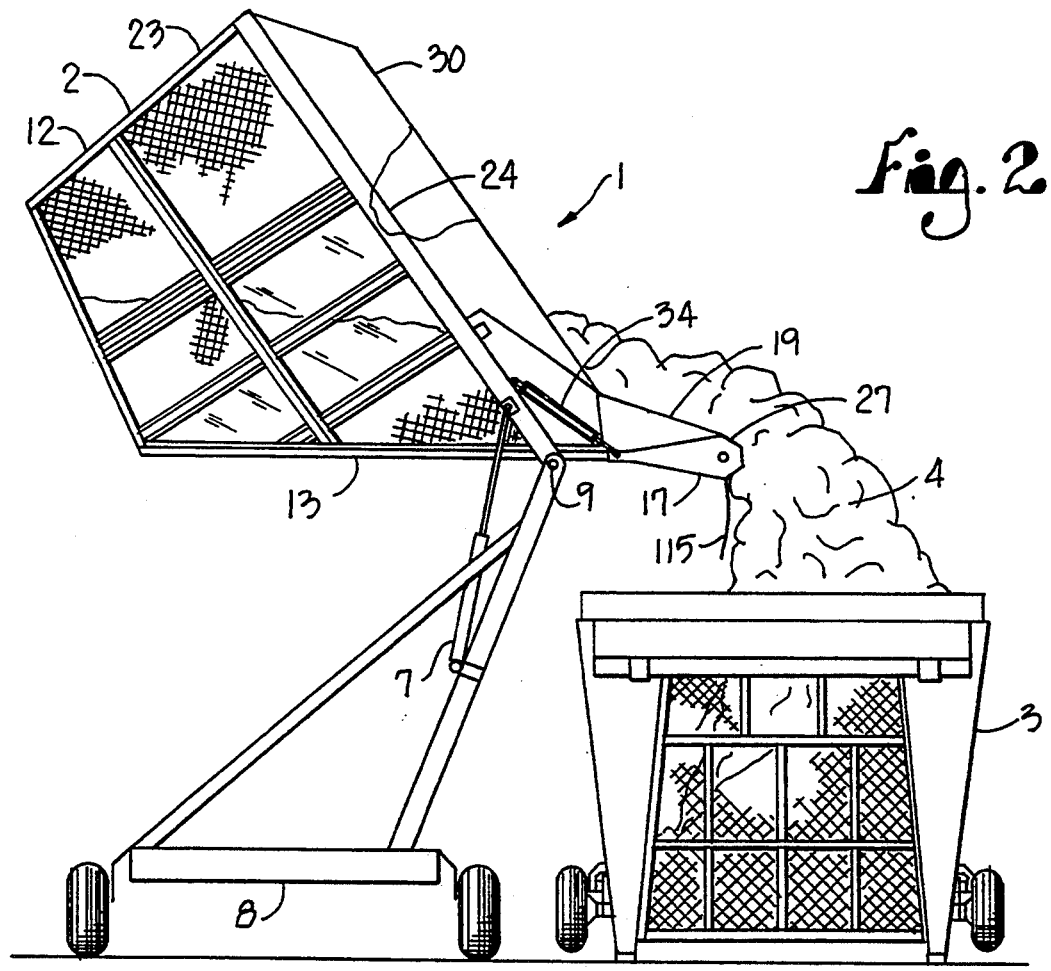
FIG. 2 is an end elevational view of the vehicle, with the dumping basket in the dumping position and the drop chute extension in the extended position.
Figure 8:
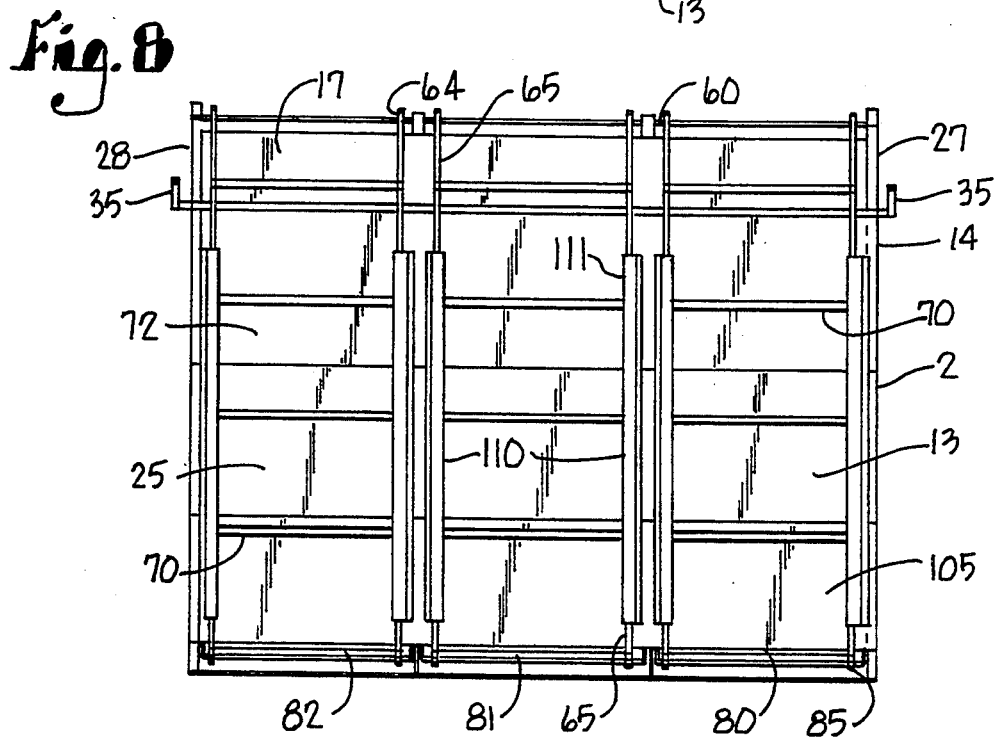
Fig. 8 is a fragmentary, elevational view showing a vehicle drop out side wall and conveyor arrangement from the interior of the vehicle basket.

FIG. 2 discloses the vehicle 1 having the basket 2 lifted away from the transport base 8 by the hydraulic lift cylinders 7. The drop chute extension 17 is in the unloading position 19 and is unloading cotton bolls 4 out of the basket 2 into the module builder or trailer 3. When the drop chute extension is in the unloading position 19 and the basket 2 is adjacent to and not lifted away from the transport base 8, the height from the ground to the top of the exemplary drop chute extension 17 is approximately 17 feet. The height from the ground to the extension pivot joint 18, when the drop chute extension 17 is in the towing position 20, is approximately 14 feet. The drop chute extension 17 has an approximate length of four feet ten inches. With the use of the drop chute extension 17, a conveyor floor 25, FIG. 8, is extended, which unloads the cotton bolls 4 into the middle and far side of the module builder or trailer 3. The drop chute extension 17, when folded over and into the basket 2 of the vehicle 1, reduces both the transport height and width of the vehicle 1.

Figure 3:
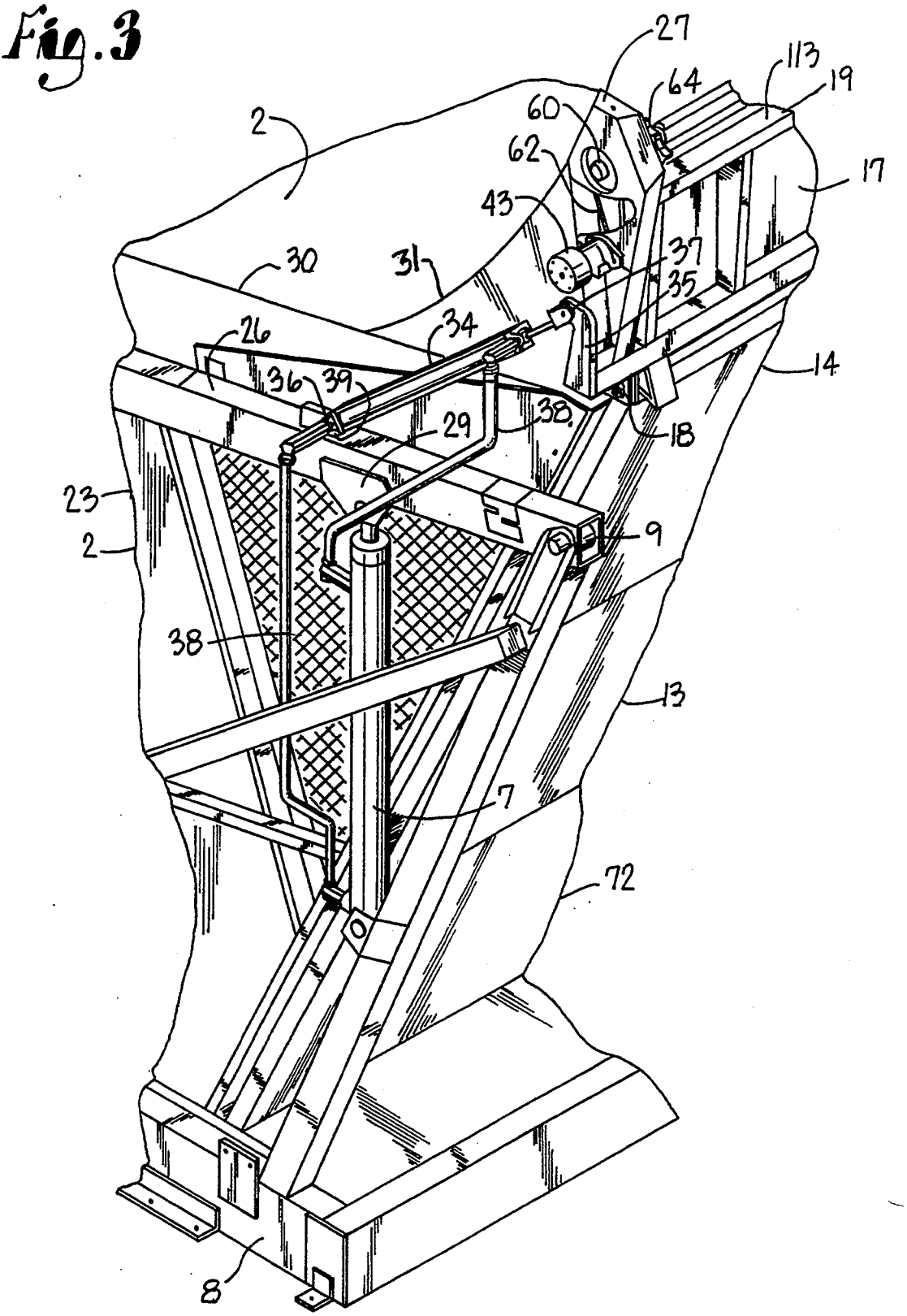
FIG. 3 is a fragmentary end view of the drop chute extension in the full extended position, showing the hydraulic connections from the hydraulic arm extension cylinders to the hydraulic cylinders of the lift basket of the vehicle.

Referring to FIG. 3, a fragmentary end view of the drop chute extension 17 is shown, with the drop chute extension 17 being in the unloading position 19. The basket 2, has cylinder mounts 29 securely fastened to upper ends 26 of the first and second side walls 23 and 24. The upper ends 26 also join extension walls 30 that extend substantially along the length of the first and second side walls 23 and 24 and which are mounted adjacent to the cylinder mount walls 29 to provide additional loading capacity. The drop chute extension 17 has first and second opposite extension arms 27 and 28 that are connected to the first and second opposite side walls 23 and 24 of the basket 2 at the pivots 18. The drop chute extension 17 also has side guards 31 extending from the drop chute extension 17 to the top end of the extension walls 30 and which serve to keep the cotton bolls from spilling out over the sides.

The drop chute extension 17 is rotated by hydraulic extension arm cylinders 34 that are mounted on each of the sides of the drop chute extension 17. The drop chute extension 17 has upstanding lever arms 35 that are located on lower ends of the first and second opposite extension arms 27 and 28, respectively, for joining connection ends 37 of the hydraulic extension arm cylinders 34 to the drop chute extension 17. The hydraulic extension arm cylinders 34 have opposite connection ends 39 for connecting the hydraulic extension arm cylinders 34 to mounting ears 36 secured to the upper ends 26 of the first and second opposite side walls 23 and 24. The hydraulic extension arm cylinders 34 are connected to the hydraulic lift cylinders 7 through hydraulic lines 38. When the operator of the vehicle 1 energizes the primary hydraulic system of the tractor (not shown) to lift the basket 2 from the transport base 8, the hydraulic fluid first travels through the hydraulic lines 38 to fully extend the hydraulic extension arm cylinders 34, thereby positioning the drop chute extension 17 to the unloading position When the hydraulic extension arm cylinders 34 are fully extended, the hydraulic fluid then travels through other hydraulic lines 38 to the hydraulic lift cylinders 7 and cause the lift cylinders 7 to raise the basket 2 from the transport base 8. The interconnection of the hydraulic lift cylinders 7 and the hydraulic extension arm cylinders 34 ensures that the drop chute extension 17 will be in the full extended unloading position 19, shown in FIG. 3, prior to lifting the basket 2. This safety feature ensures that the drop chute extension 17 will be in the unloading position 19 before the basket 2 moves.

When the operator of the tractor (not shown) engages the controls of the primary hydraulic system to lower the basket 2 from the raised position, the lift cylinders 7 will be fully retracted before allowing the hydraulic extension arm cylinders 34 to retract and swing the drop chute extension 17 from the unloading position 19 to the towing position 20. The interconnection of the hydraulic extension arm cylinders 34 with the lift cylinders 7 and the primary hydraulic system facilitates the operation of the drop chute extension 17 without having to install an additional hydraulic system.

Figure 4:
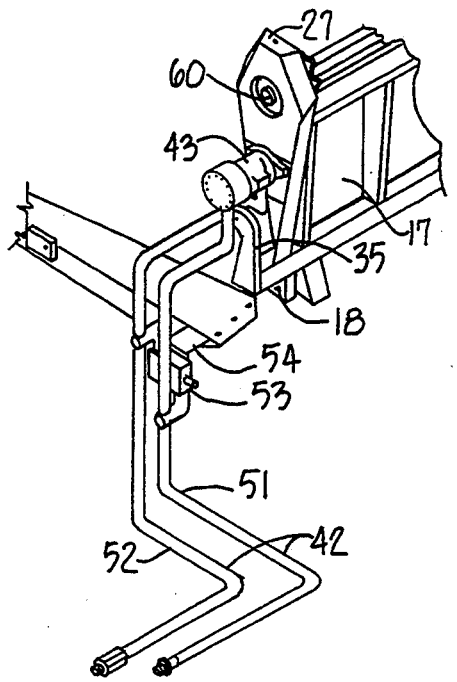
FIG. 4 is an enlarged fragmentary, disassembled view of a portion of the drop chute extension in the full extended position, showing the hydraulic connections from the drop chute extension hydraulic motor through the safety selector valve to the second hydraulic system of the vehicle.

Referring to FIG. 4, an enlarged fragmentary view of the drop chute extension 17 is shown with the drop chute extension 17 in the extended, or unloading position 19 and illustrating connections of a second hydraulic system 42 to the vehicle 1. The second hydraulic system 42 includes a hydraulic motor 43, hydraulic pressure lines 51, hydraulic return lines 52 and a safety selector valve 53 that is attached to the first opposite side wall 2 by a selector valve mount 54. The safety selector valve 53 has a valve spring 55 and a valve detent shaft 56. The second hydraulic system 42 also has a uni-directional flow check valve in the valve 53. The hydraulic pressure line 51 is connected from the tractor to a bottom port in the selector valve 53, which is then connected through hydraulic pressure line 51 to the hydraulic motor 43. The hydraulic motor 43 has a return port that provides connection to the hydraulic return line 52 to a top port in the selector valve 53, which is connected via a hydraulic return line 52 to the directional flow valve 59.

Figure 6:
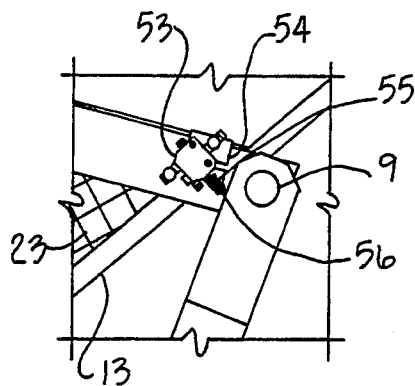
FIG. 6 is a fragmentary, enlarged view of the selector valve while the basket is lifted off the vehicle frame, showing the selector valve in the flow position to allow operation of the drop chute extension hydraulic motor.
Figure 7:
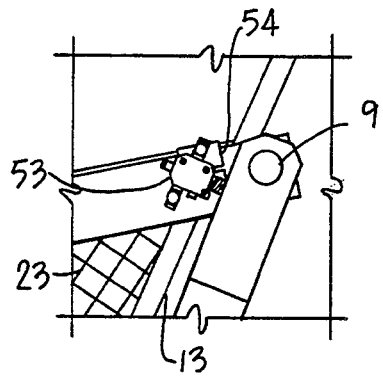
FIG. 7 is a fragmentary, enlarged view of the selector valve sequenced with FIG. 6 and showing the selector valve in a fluid loop recycle position, allowing the hydraulic fluid to freely low through the drop chute extension hydraulic motor.

As best seen in FIGS. 6 and 7, the safety selector valve 53 will shut off the hydraulic pressure from the tractor when the basket 2 is lowered on the transport base 8. The selector valve 53 shuts the hydraulic pressure to the hydraulic motor 43 by bypassing the hydraulic flow from the hydraulic pressure line 51 back to the tractor through the hydraulic return line 52 when the valve spring 55 is in the compressed position, thereby moving the valve detent shaft 56 to the outward position. When the basket 2 is lifted off the transport base 8, the compression force against the valve spring 55 is released, and allows the valve detent shaft 56 to move to the flow position, as best shown in FIG. 6. When the valve detent shaft 56 is in the flow position, pressurized hydraulic fluid from the tractor through hydraulic pressure line 51 is routed to travel to and drives the hydraulic motor 43. When the valve detent shaft 56 is in the outward position, the hydraulic fluid from the hydraulic pressure lines 51 is returned to the reservoir of the second hydraulic system 42 in the tractor and the hydraulic motor 43 is allowed to free flow. The hydraulic motor 43 free flows by having unpressurized fluid flow from the hydraulic motor 43 through the return line 52, through the selector valve 53 and the pressure line 51 back to the hydraulic motor 43. This flow prevents operation of the conveyor floor 25 of the drop chute extension 17 until the drop chute extension 17 is fully extended and the lift cylinders 7 have lifted the basket 2 off the transport base 8.

The hydraulic motor 43 rotatably drives a conveyor top shaft 60 through a speed reducer arrangement including a sprocket and flexible belt 62. The top shaft 60 has a plurality of drive sprockets 64 spaced along its length around which the same number of conveyor chains 65 are entrained. These conveyor chains 65 are substantially wrapped around the dump out end wall 13 and the drop chute extension 17 and carry sweeper bars 70 secured thereto at intervals and that sweep the cotton bolls up and outwardly of the basket 2 when the basket 2 is raised and tilted to the dump position and the hydraulic drive for the conveyor chains is actuated.

The interior surface, FIG. 8, of the dump out end wall 13 is formed of a plurality of plates 72, such as formed of sheet metal, and which present a smooth surface for the movement of the cotton bolls across it. The conveyor chains 65 with their attached sweeper bars 70 are moved across the plates 72 to sweep the cotton bolls out of the basket 2 and into the transport trailer. In the illustrated example, the conveyor chains 65 circulate about the driven top shaft 60 and idler or non driven bottom shafts 73, 74 and 75, with a like number of chain sprockets 64. There are a total of six conveyor chains 65 which combine to comprise three conveyor sets 80, 81, and 82, with each set having a plurality of sweeper bars 70.

In the illustrated example, each conveyor set 80, 81 and 82 has a single associated idler bottom shaft arrangement 73, 74, and 75, with each arrangement including a shaft 73, 74 or 75 with opposite bottom end sprockets 85. The shaft has opposite ends supported in bearings 86 which are mounted on downwardly extensible rods 88. The rods are spring biased to an extended position by a mounting bracket 90 and spring 91 arrangement attached to a back side of the end wall 13. Each idler bottom shaft arrangement 93, 94, and 95 is biased extended to tension the chains 65. On the wall 13 back side, FIG. 5, the chains 65 travel in rear guide sets 100, which are substantially C shaped sections with confronting openings and between which the sweeper bars 70 extend. There are two guide sets 100 for each conveyor set 80, 81, and 82. Adjacent a bottom edge 102 of the end wall 13, the chains 65 travel through passages 104 in the plates 72 for return over an inside surface 105 of the end wall 13, FIG. 8. There are also front guide sets 110, which include wear strips for chain travel and confronting channel members 111. The front guide sets terminate at an upper portion of the dump out end wall 13 and prior to the chute extension 17. The front and rear guide sets 110 and 100 serve to alleviate fouling of the chain 65 and prevent undue sagging when the chute extension 17 is folded, although some sag is accommodated by the outwardly biased idler bottom shafts 73, 74, and 75.

To prevent excessive spillage of the cotton bolls as they are unloaded by being conveyed by the sweeper bars 70 and outwardly over a lip 113 of the drop chute extension 17, flaps 115, such as of heavy, rubberized fabric belting material are attached, as by fasteners to the lip 113 so that they hang down toward the module builder or trailer. The flaps 115 additionally serve a guard or cover function to shield portions of moving machinery.

To review the operation and use of the drop chute extension 17, the operator of the tractor (not shown) positions the vehicle 1 adjacent to a module builder or trailer 3 such that the basket 2 is parallel to the module builder or trailer 3. The operator then actuates controls to the primary hydraulic system that operates the lift cylinders 7 and extension arm cylinders 34. Actuation of the primary hydraulic system will first cause the extension arm cylinders 34 to fully extend the drop chute extension 17 from the towing position 20 to the unloading position 19. Once the drop chute extension 17 is fully extended, the lift cylinders 7 lift the basket 2 by swinging the basket 2 up and away from the transport base 8. Once the lift cylinders 7 are fully extended, the operator actuates controls for the second hydraulic system 42 of the tractor (not shown) which routes hydraulic fluid through the pressure lines 51 one way through the selector valve 53 to the hydraulic motor 43. The hydraulic fluid is routed to the hydraulic motor 43 because the selector valve detent shaft 56 is in the flow position since the valve spring 55 is not being compressed. The hydraulic fluid causes the hydraulic motor 43 to rotate the top shaft 60. The rotation of the top shaft 60 causes the sprockets 64 to rotate and drive the conveyor chains 65 and the sweeper bars 70, unloading the cotton bolls 4 from the basket 2 of vehicle 1 into the middle and far areas of the module builder or trailer 3.

It is to be understood that while certain forms of this invention have been illustrated and described, the invention is not limited thereto, except insofar as such limitations are included in the following claims.

What is claimed and desired to be secured by Letters Patent is as follows:

1. A vehicle for transporting and dumping loads of particulate material and comprising:
   a) a vehicle frame having spaced, ground engaging wheels extending therefrom, and angularly upstanding spaced frame members projecting upward from said vehicle frame;
   b) a dump basket operative to contain said loads of particulate material therein, said dump basket situated between said spaced frame members and having spaced end walls, a first side wall, and a dump side wall, said spaced end walls, said first side wall and said dump side walls each having respective upper edges, the respective junctures of said upper edges forming spaced, upper corners, said dump basket having hinge connections to said frame members at said upper corners of said upper edges of said end walls and said dump side wall for upward rotation, tilting and dumping of said loads of particulate material of said dump basket;
   c) an extension portion swingably connected to said dump basket by hinges and extending along said upper edge of said dump side wall;
   d) a conveyor movable over a basket interior surface of said dump side wall and said extension portion for engaging and transporting said contents out of said dump basket; and e) power fluid rams for causing swinging of said extension portion about said hinges and retraction and extension of said extension portion relative to said dump basket.

2. The vehicle set forth in claim 1 wherein said conveyor is driven by hydraulic power means, and including switch means associated with said power fluid rams and preventing operation of said conveyor until said extension portion is fully extended.

3. A vehicle for transporting and dumping loads of particulate material and comprising:
 a) a vehicle frame having spaced, ground engaging wheels extending therefrom, and angularly upstanding spaced frame members projecting upward from said vehicle frame;
 b) a dump basket operative to contain said loads of particulate material therein, said dump basket situated between said spaced frame members and having spaced end walls, a first side wall, and a dump side wall, said spaced end walls, said first side wall and said dump side wall each having respective upper edges, the respective junctures of said upper edges forming spaced, upper corners, said dump basket having hinge connections to said frame members at said upper corners of said upper edges of said end walls and said dump side wall for upward rotation, tilting and dumping of said loads of particulate material of said dump basket;
 c) an extension means hingedly connected to said dump basket and extending along said dump side wall along said upper edge thereof;
 d) motive means for causing swinging of said extension means about hinges connected to said dump basket and retraction and extension of said extension means relative to said dump basket; and
 e) a conveyor means movable over basket interior surface of said dump side wall and over said extension means for transporting said contents out of said dump basket, said conveyor means including a plurality of sweep bars movable across said interior surface of said dump side wall and over said extension means and further including idler means biased outwardly to take up slack in said conveyor means occasioned by said swinging said extension means relative to said dump side wall, said conveyor means being driven by hydraulic power means, and including a switch associated with said motive means for preventing operation of said conveyor means until said extension means is extended.

4. A vehicle for transporting and dumping loads of particulate material, said vehicle comprising:
 a) a vehicle frame having spaced, ground engaging wheels extending therefrom for movement over a surface and angularly upstanding spaced frame members projecting upward from said vehicle frame, said vehicle frame having a forwardly extending connection for attachment to a towing vehicle;
 b) a dump basket operative to contain said loads of particulate material therein, said dump basket situated between said paced frame members and having spaced end walls, first side wall and a dump side wall, said spaced end walls, said first side wall and said dump side wall each having respective upper edges, the respective juncture of said upper edges forming spaced upper corners, said dump basket having first pressurized cylinders connected to said spaced frame members at said upper edges of said end walls, and hinge connections to said frame members at said upper corners of said upper edges of said end walls and said dump side wall for upward rotation and tilting of said dump basket for dumping said loads of particulate material from said dump basket;
 c) an extension portion swingably connected to said dump basket by hinges and extending along said upper edge of said dump side wall;
 d) a conveyor movable over a basket interior surface of said dump side wall and along a length of said extension portion for engaging and transporting said loads of particulate material out of said dump basket;
 e) second pressurized cylinders operative for swinging said extension portion about said hinges and retraction and extension of said extension portion relative to said dump basket; and
 f) said conveyor having a safety switch associated with said second pressurized cylinders, said safety switch operative to prevent operation of said conveyor until said extension portion is fully extended 5. A vehicle transporting and dumping loads of particulate material, said vehicle comprising:
 a) a vehicle frame having spaced, ground enraging wheels extending therefrom for movement over a surface and an upstanding spaced frame member projecting upward from said vehicle frame;
 b) a dump basket operative to contain said loads of particulate material therein and having a plurality of walls including a dump side wall, said dump basket extensibly and swingably mounted to said upstanding spaced frame member, said spaced frame member operative for raising and tilting said dump basket for dumping said loads of particulate material from said dump basket;
 c) an extension portion of said dump side wall swingably mounted and connected to an upper edge of said dump side wall by hinges for folding of said extension portion relative to said dump side wall and retraction into said dump basket;
 d) a conveyor movable over said dump side wall and along a length of said extension portion for engaging and transporting said loads of particulate material out of said dump basket;
 e) pressurized cylinders extending between said dump basket and said extension portion for swinging of said extension portion about said hinges; and
 f) said conveyor having a safety switch associated with said pressurized cylinders and operative to prevent operation of said conveyor until said extension portion is fully extended.

6. The vehicle set forth in claim 5 wherein said dump basket has opposite end walls with said dump side wall extending therebetween, said extension portion extending substantially a full length of said dump side wall.

7. A vehicle for transporting and dumping loads of particulate material said vehicle comprising:
 a) a vehicle frame having spaced, ground engaging wheels extending therefrom for movement over a surface, and an upstanding spaced frame member projecting upward from said vehicle frame;
 b) a dump basket operative to contain said loads of particulate material therein and having a plurality of walls including a dump side wall and opposite end walls with said dump side wall extending therebetween, said dump basket extensibly and swingably mounted to said upstanding spaced frame member and having first pressurized cylinders connected to said spaced frame member at opposite upper edges of said end walls for raising and tilting said dump basket for dumping said loads of particulate material from said dump basket;

c) an extension portion of said dump side wall swingably mounted and connected to an upper edge of said dump side wall by hinges for folding of said extension portion relative to said dump side wall and retraction into said dump basket, said extension portion extending substantially a full length of said dump side wall;

d) second pressurized cylinders extending between said dump basket and said extension portion for swinging of said extension portion about said hinges; and e) a conveyor movable over said dump side wall and along a length of said extension portion for engaging and transporting said loads of particulate material out of said dump basket, said conveyor having a safety switch associated with said second pressurized cylinders and operative to prevent operation of said conveyor until said extension portion is fully extended.

8. A vehicle for transporting and dumping loads of particulate material, said vehicle comprising:

a) a vehicle frame having spaced, ground engaging wheels extending therefrom and an upstanding spaced frame member projecting upward from said vehicle frame;

b) a dump basket operative to contain said loads of particulate material therein and having plurality of walls including a dump side wall, said dump basket extensibly and swingably mounted to said upstanding spaced frame member, said spaced frame member operative for raising and tilting said dump basket for dumping said loads of particulate material from said dump basket;

c) an extension portion of said dump side wall swingably mounted and connected to an upper edge of said dump side wall; and d) a conveyor movable over said dump side wall and along a length of said extension portion for engaging and transporting said loads of particulate material out of said dump basket, said conveyor having a safety switch operative to prevent operation of said conveyor until said extension portion is fully extended.

9. The vehicle set forth in claim 8 including hinges connecting said extension portion to said upper edge of said dump side wall for folding of said extension portion relative to said dump side wall and retraction into said dump basket, and pressure fluid actuated rams extending between said dump basket and said extension portion for swinging of said extension portion about said hinges.

10. The vehicle set forth in claim 9 wherein said dump basket has opposite end walls with said dump side wall extending therebetween and said extension portion extends substantially a full length of said dump side wall.

* * * * *